United States Patent
Yu et al.

(10) Patent No.: US 11,156,472 B2
(45) Date of Patent: *Oct. 26, 2021

(54) USER INTERFACE FOR AUGMENTED REALITY NAVIGATION

(71) Applicant: Phiar Technologies, Inc., Redwood City, CA (US)

(72) Inventors: Chen-Ping Yu, Santa Clara, CA (US); Myvictor Tran, Vancouver (CA)

(73) Assignee: Phiar Technologies, Inc., Redwood City, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/569,633

(22) Filed: Sep. 12, 2019

(65) Prior Publication Data
US 2020/0132490 A1    Apr. 30, 2020

Related U.S. Application Data

(63) Continuation of application No. 16/224,677, filed on Dec. 18, 2018, now Pat. No. 10,488,215.
(Continued)

(51) Int. Cl.
*G01C 21/36* (2006.01)
*G06T 19/00* (2011.01)
*G06K 9/00* (2006.01)

(52) U.S. Cl.
CPC ....... *G01C 21/365* (2013.01); *G01C 21/3632* (2013.01); *G01C 21/3638* (2013.01);
(Continued)

(58) Field of Classification Search
CPC .............. G01C 21/365; G01C 21/3632; G01C 21/3638; G01C 21/3647; G06K 9/00805; G06T 19/006
See application file for complete search history.

(56) References Cited

U.S. PATENT DOCUMENTS 8,195,386 B2    6/2012    Hu et al.
8,493,198 B1    7/2013    Vasquez et al.
(Continued)

FOREIGN PATENT DOCUMENTS

CN    103105174 A    5/2013
KR    20120007781 U    11/2012
(Continued)

OTHER PUBLICATIONS

Office Action in U.S. Appl. No. 16/999,058, dated Dec. 14, 2020.
(Continued)

*Primary Examiner* — Thomas Ingram
(74) *Attorney, Agent, or Firm* — Cognition IP, P.C.; Edward Steakley

(57) ABSTRACT

Navigation assistance is provided to a user of a vehicle. A live view shows a scene of the roadway and navigation indicators may be superimposed on to the scene of the roadway using augmented reality. Interface elements on the live view provide additional information related to navigation. A map view may also be provided and be toggled from the live view by a toggle interaction. In addition, a hazard detection system may be provided to detect hazards and display indicators of the hazards to the user.

26 Claims, 5 Drawing Sheets

Related U.S. Application Data

(60) Provisional application No. 62/751,512, filed on Oct. 26, 2018.

(52) U.S. Cl.
CPC ..... *G01C 21/3647* (2013.01); *G06K 9/00805* (2013.01); *G06T 19/006* (2013.01)

(56) References Cited

U.S. PATENT DOCUMENTS

| | | | |
|---|---|---|---|
| 9,525,964 B2* | 12/2016 | Piippo | H04W 4/02 |
| 10,055,650 B2 | 8/2018 | Ho et al. | |
| 2003/0210228 A1* | 11/2003 | Ebersole | G06F 3/147 |
| | | | 345/157 |
| 2011/0153198 A1* | 6/2011 | Kokkas | G01C 21/3647 |
| | | | 701/533 |
| 2011/0199479 A1* | 8/2011 | Waldman | G01C 21/3602 |
| | | | 348/116 |
| 2011/0279446 A1* | 11/2011 | Castro | G06T 15/20 |
| | | | 345/419 |
| 2012/0224060 A1* | 9/2012 | Gurevich | B60R 1/00 |
| | | | 348/148 |
| 2012/0226437 A1 | 9/2012 | Li et al. | |
| 2013/0088514 A1* | 4/2013 | Breuss-Schneeweis | |
| | | | G06T 19/006 |
| | | | 345/633 |
| 2013/0102283 A1* | 4/2013 | Lau | H04W 4/02 |
| | | | 455/411 |
| 2013/0178257 A1* | 7/2013 | Langseth | A63F 13/812 |
| | | | 463/4 |
| 2013/0194110 A1 | 8/2013 | Kim et al. | |
| 2013/0197801 A1* | 8/2013 | Geelen | G01C 21/3647 |
| | | | 701/461 |
| 2013/0211718 A1* | 8/2013 | Yoo | G01C 21/206 |
| | | | 701/500 |
| 2013/0328928 A1* | 12/2013 | Yamagishi | A63F 13/25 |
| | | | 345/633 |
| 2014/0063058 A1* | 3/2014 | Fialho | G06T 19/00 |
| | | | 345/633 |
| 2014/0063064 A1 | 3/2014 | Seo et al. | |
| 2014/0207517 A1* | 7/2014 | Oshima | H04N 5/23293 |
| | | | 705/7.29 |
| 2014/0236475 A1* | 8/2014 | Venkatraman | G01C 21/206 |
| | | | 701/420 |
| 2014/0354684 A1 | 12/2014 | Beckwith | |
| 2014/0362195 A1* | 12/2014 | Ng-Thow-Hing | |
| | | | G06K 9/00335 |
| | | | 348/51 |
| 2015/0046812 A1* | 2/2015 | Darby | G06F 3/04847 |
| | | | 715/716 |
| 2015/0062168 A1 | 3/2015 | Ng-Thow-Hing et al. | |
| 2015/0175068 A1* | 6/2015 | Szostak | B60K 35/00 |
| | | | 340/435 |
| 2015/0204687 A1* | 7/2015 | Yoon | G01C 21/3647 |
| | | | 701/436 |
| 2015/0211877 A1* | 7/2015 | Laycock | G02B 27/0101 |
| | | | 701/444 |
| 2016/0003636 A1 | 1/2016 | Ng-Thow-Hing et al. | |
| 2017/0193300 A1* | 7/2017 | Shatz | H04N 5/23216 |
| 2018/0209802 A1* | 7/2018 | Jung | G01C 21/3602 |

FOREIGN PATENT DOCUMENTS

| | | |
|---|---|---|
| KR | 20150074750 A | 7/2015 |
| KR | 20170101758 A | 9/2017 |

OTHER PUBLICATIONS

"Augmented Reality & Driving: enhancing the driving experience," retrieved Jan. 24, 2019 <https://www.youtube.com/watch?v=0OdZXf1E7Z8>.

"Telenav's Augmented Reality," retrieved Jan. 24, 2019 <https://www.youtube.com/watch?v=2Kt0ad03iHU>.

"MBUX Augmented Reality for Navigation in Mercedes-Benz A-Class 2018::[1001 cars]," retrieved Jan. 24, 2019 <https://www.youtube.com/watch?v=44myNm8T1Vw>.

"Windshield HUD User Interface—Augmented Reality Navigation," retrieved Jan. 24, 2019 <https://www.youtube.com/watch?v=g-_2KmHRqQM>.

"Hyundai Augmented Reality Demonstration—CES 2015," retrieved Jan. 24, 2019 <https://www.youtube.com/watch?v=iZg89ov75QQ>.

"Wikitude Navigation," retrieved Jan. 24, 2019 <https://www.wikitude.com/showcase/wikitude-navigation/>.

Rusch, Michelle L. et al., "Directing driver attention with augmented reality cues", US National Library of Medicine National Institutes of Health, Jan. 16, 2013 (https://www.ncbi.nlm.nih.gov/pmc/articles/PMC3891797/).

\* cited by examiner

USER INTERFACE FOR AUGMENTED REALITY NAVIGATION

CROSS-REFERENCE TO RELATED APPLICATIONS

This application is a continuation of U.S. application Ser. No. 16/224,677, filed Dec. 18, 2018, which claims the benefit of U.S. Provisional Patent Application No. 62/751,512, filed Oct. 26, 2018, which are all hereby incorporated by reference in their entirety.

BACKGROUND

Traditional methods of interactive navigation involve a display of a map, often in an overhead view, of the local area around a vehicle and providing audio cues to the driver to guide him along a route. A disadvantage of this type of navigation is that it requires the driver to take his eyes off the road to view the map. Moreover, it can be unclear to the driver how to translate navigation instructions presented in an overhead map view into correct actions to take in a real-world environment.

SUMMARY

Some embodiments relate to systems and methods for presenting a live view of a scene to a driver and superimposing one or more graphical elements on to the scene to provide an augmented reality display of turn-by-turn directions. In some embodiments, a route overlay is superimposed on to the scene to show the present route. In some embodiments, a maneuver indicator is superimposed on to the scene to show the location of the next maneuver. In some embodiments, additional user interface elements may be displayed on a live view, such as a panel of additional navigation information, a panel indicating a next maneuver, a graphical display of auxiliary information, and a mini-map. In an exemplary embodiment, the user interface display is clean and uncluttered to allow the user a clear view of the roadway while simultaneously viewing pertinent information.

In one exemplary method, real-time navigation assistance is provided to a user. The method may include receiving navigation information and determining from the navigation information a route, a location of the vehicle, a next maneuver, or additional information. A camera of an electronic device may include recording a view of the roadway. An electronic display may display the roadway with a superimposed augmented reality display showing, for example, a route overlay and a maneuver indicator.

In one exemplary method, a toggle interaction may be received from the user, and, in response, the display may be toggled from the live view to a map view, where the map view displays a map of an area around the vehicle. A second toggle interaction may cause the view to toggle from the map view to the live view. In some embodiments, toggle interactions are caused by user interactions on a mini-map or mini-feed.

In one exemplary method, a hazard detection system may be provided. The hazard detection system may detect hazardous objects and also detect non-hazardous objects. The hazardous objects may cause one or more alerts, indications, or markers to be shown to the user, while the non-hazardous objects to do not trigger those actions. A display may show a hazard indicator, a hazard marker, a hazard frame, and a hazard route overlay.

DETAILED DESCRIPTION

Figure 1:
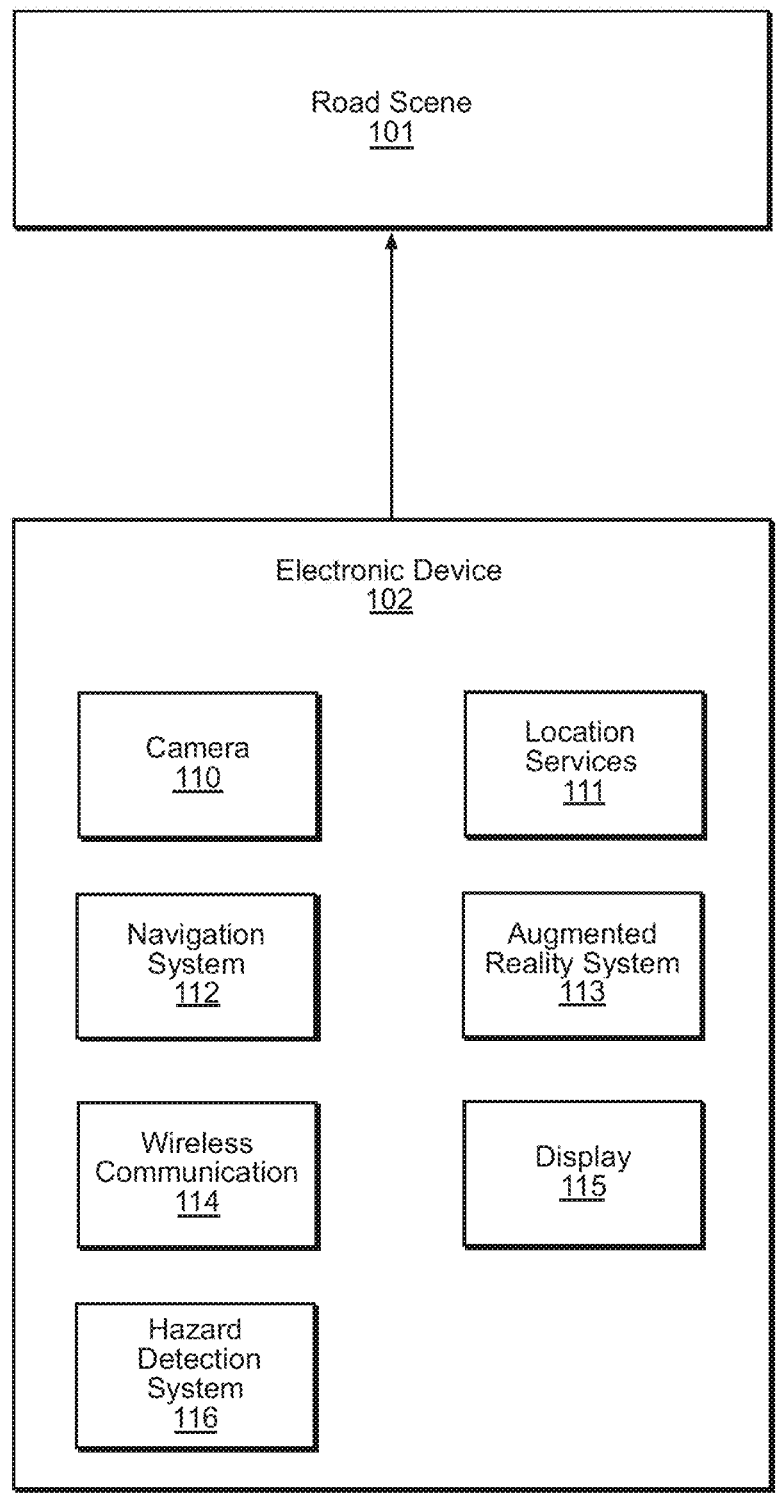
FIG. 1 illustrates an exemplary electronic device for augmented reality navigation assistance in an embodiment.

In this specification, reference is made in detail to specific embodiments of the invention.

Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein. In some embodiments, the computer system may incorporate elements of artificial intelligence (AI) or machine learning (ML). In other embodiments, non-AI and non-ML techniques are used.

FIG. 1 illustrates an exemplary electronic device 102 for augmented reality navigation assistance. In an embodiment, the electronic device 102 is used in a vehicle, such as a car, truck, van, bicycle, motorcycle, scooter, or other vehicle to provide navigation assistance to a driver or passenger. In one embodiment, the electronic device 102 is a mobile device such as a smartphone, tablet, notebook, laptop, music player, smartwatch, augmented reality or virtual reality headset, glasses, or other mobile device. In other embodiments, the electronic device 102 may be integrated into a vehicle such as in a vehicle dashboard or windshield.

The electronic device 102 may configured so that a camera 110 of the electronic device 102 has a clear view of the road 101 in the direction of vehicle travel. For example, in a car, truck, or van, the electronic device 102 may be mounted on the dashboard with a view out the front windshield. For instance, the electronic device 102 may be held in a stand that is held with suction, weight, or friction to the dashboard. In other embodiments, the electronic device 102 may be manually held by a user, attached to the windshield such as with suction or adhesive, attached to the rearview mirror, or integrated into a dashboard or seat of the vehicle. In still other embodiments, the camera 110 may be separate from the electronic device. For example, the camera 110 may be integrated into the outside of a vehicle to gather video of the road scene and the electronic device 102 may be integrated into a vehicle dashboard, and the two may be connected by wire or wirelessly to exchange data.

The electronic device 102 may include location services to locate the physical location of the electronic device 102 in the world. Location services may include a Global Navigation Satellite System (GNSS), Global Positioning System (GPS), Wi-Fi location services using triangulation of Wi-Fi signals, triangulation of radio frequency signals, and other positioning systems.

The electronic device 102 may include a navigation system 112. The navigation system 112 may compute a route from a starting location to an ending location using various search algorithms. The starting location and ending location may be configured by the user. The navigation system 112 may include maps of locales, including roads that serve as connectors from one location to another. One of the functions of the navigation system 112 may be to compute a set of turn-by-turn directions to travel from the starting location to the ending location by traversing roads on a map.

The electronic device 102 may include a display 115. The display may be a screen such as a liquid crystal display (LCD) or cathode ray tube (CRT) that visually displays information to a user. In one embodiment, the display may be a heads-up display projected or reflected onto part or all of a transparent or translucent surface. In one embodiment, the display may be embedded into a vehicle windshield or projected on to the windshield. In one embodiment, the display may be a headset or glasses worn by a user. In one mode, the display may display map information to the user. In another mode, the display may display a view of the road, through display of video data collected from camera 110, with augmented reality features added to the road scene.

The electronic device 102 may include an augmented reality system 113. The augmented reality system 113 may display virtual imagery in a scene as if the imagery was present in the real world. For example, the augmented reality system 113 may add objects to video information as if those elements were present. Augmented reality system 113 may be used with video or still photos.

The electronic device 102 may also include a wireless communications system 114. The wireless communications system 114 may include, for example, cellular, 5G, 4G, 3G, LTE, Wi-Fi, Bluetooth, or other technologies. The wireless communications system 114 may allow the electronic device 102 to connect to the Internet or other networks and to remote computer servers. The wireless communications system 114 may enable, for example, location services to access or compute location information and for the navigation system 112 to download updated maps.

The electronic device 102 may also include a hazard detection system 116. The hazard detection system 116 may comprise one or more computer vision algorithms and machine learning models. For example, the hazard detection system may include algorithms and models for object detection, object classification, and hazard prediction. Some embodiments of the hazard detection system may comprise one or more neural networks, including fully-connected neural networks, convolutional neural networks, recurrent neural networks, or attention models. The hazard detection system 116 may detect, identify, and track objects in image input such as still photos or video captured by camera 110. The hazard detection system 116 may additionally predict whether any of the tracked objects are hazardous based on attribute data such as type, size, location, distance, or movement of the tracked objects. Hazard detection system 116 may predict whether an object is hazardous by applying object classification to classify objects into hazardous and non-hazardous categories. The hazard detection system 116 may be trained on labeled training data comprising examples of hazardous and non-hazardous objects with associated images.

In one embodiment, an object is hazardous if it is likely to damage the vehicle, induce loss of control, injure other people, or damage external property. Therefore, it is advantageous to identify these objects to the user. Optionally, hazardous objects may be defined by a user setting a threshold probability that the object will damage the vehicle, induce loss of control, injure other people, or damage external property before being classified as hazardous. A non-hazardous object may be safely ignored and does not need to be emphasized to the user. In one embodiment, a pedestrian standing or walking in the middle of the road may be predicted as hazardous, while a pedestrian standing or walking alongside the road may be predicted as non-hazardous. In another example a fallen tree on the road may be hazardous, while a plastic bag may be non-hazardous. In some embodiments, hazard detection system 116 may generate some or all of the attribute data of tracked objects while identifying and tracking the objects.

In one embodiment, the electronic device 102 may be a smartphone that is aimed at the road in the direction of travel, such as by mounting on a dashboard or being held in a user's hand. The rear camera of the smartphone may record video of the road scene, and the video may be displayed on an LCD screen on the opposite side of the smartphone with augmented reality graphics added by the processor of the smartphone. The smartphone may also have a front camera on the same side as the LCD screen.

Figure 2:
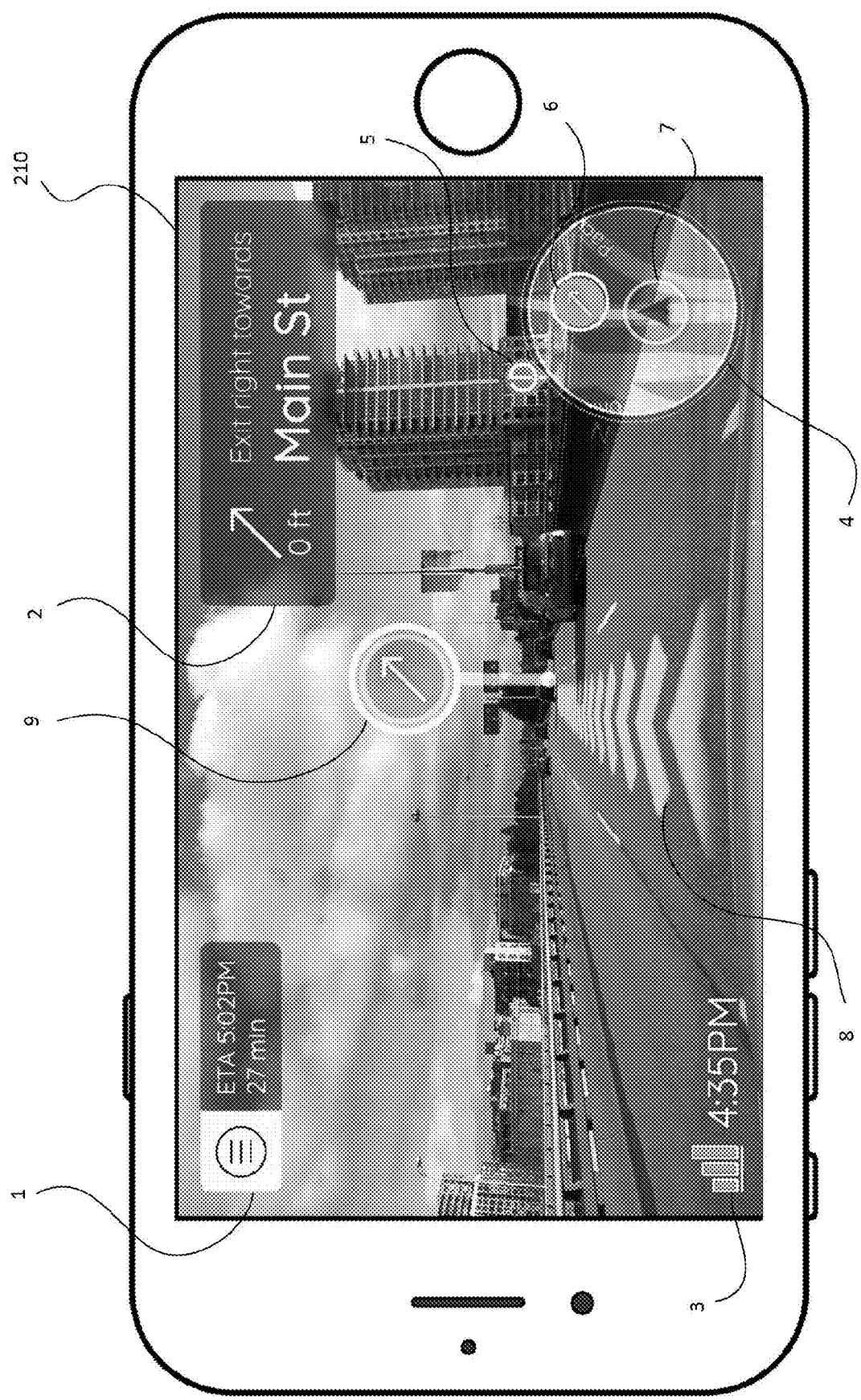
FIG. 2 illustrates an exemplary live view in an embodiment.

FIG. 2 illustrates an exemplary live view 210 displayed on the electronic device 102. The live view 210 may display a live video feed collected from the camera 110 along with optional augmented reality elements to help the user navigate. The live view 210 may provide helpful navigation guidance to the user that is projected on a video of the real-world scene.

In an embodiment, a user interface on the live view 210 may allow the user to control the processing and display created by the augmented reality system, navigation system, and display screen. Panel 1 may display a menu button. In some embodiments, the interface starts being devoid of other interface elements such as elements 2-9 and begins with only the menu button displayed on top of the live video feed. The menu button may then be activated to select a destination and begin a route, which then causes the generation and display of elements 2-9.

When the menu button is activated, a menu may open to allow configuring options such as settings and a destination. The menu may be, for example, a drop-down menu, separate menu screen, list of options, or other types of menus. The menu may allow the user to select a destination to navigate to. In one approach, a list of potential destinations may be displayed. The user may select a destination from the list using voice controls or physical controls such as touch. In another approach, the destination may be received from the user as text input, with optional autocomplete based on the user's partial entry of text. The text input may be received through physical controls such as a touch keyboard or through voice input which is translated to text. Other settings may also be presented and selected, such as preference for local roads or highways, setting the departure time, displaying traffic conditions, choosing alternative routes based on traffic, and so on.

After the user has selected a destination, the navigation system 112 may automatically compute a route from the current location of the vehicle to the destination. The route may include traversing one or more roads and performing one or more maneuvers to transition from one road to another. In some embodiments, route is represented as a series of turn-by-turn directions to guide the user to a destination. The route may include a final maneuver of arriving at the destination.

In addition to the menu, panel 1 may also display additional navigation information such as the estimated time of arrival and the estimated time it will take to reach the destination. All or part of panel 1 may be transparent, semi-transparent, or translucent to allow for portions of the scene behind panel 1 to be viewed through panel 1. Panel 1 is illustrated in the upper left of the screen, but it may also appear in the upper right, bottom left, or bottom right of the screen.

Panel 2 illustrates a textual indication of the next maneuver. In some embodiments, the next maneuver may be an upcoming maneuver that the navigation system recommends the user to perform to follow a set route to arrive at a destination. Maneuvers may include turns, exiting, continuing, U-turns, and other maneuvers. The navigation system may generate a series of sequential maneuvers, which, when followed, lead the user to the destination. Panel 2 may include an indicator, such as an arrow or other shape, of the direction of the maneuver and a distance to the maneuver. It may also include a textual description of the maneuver such as "turn right," "turn left," "continue," "stay straight," "exit right," "exit left," and so on. The textual description may also include descriptions of landmarks, such as roads, to further specify the maneuver. For example, a maneuver may include "Take exit 35 to Main Street." Panel 2 is illustrated in the upper right of the screen, but it may also appear in the upper left, bottom left, or bottom right of the screen. The maneuver displayed on panel 2 may also be narrated by a pre-recording or text-to-speech synthesizer. The narration may occur at fixed intervals or be triggered by an event. The trigger event may include events such as display of a new maneuver, arriving within a certain distance of the next maneuver, or arriving within a certain time to the next maneuver. The narration may include information about the triggering event such as "The next step is: take exit 35 to Main Street" or "take exit 35 to Main Street in 200 feet".

After the user and vehicle performs the maneuver indicated in panel 2, the navigation system 112 may update the route to indicate that the maneuver was performed and that a subsequent maneuver in the route is to be performed. The subsequent maneuver may be displayed in the panel 2 and with the overlay 8.

Graphical display 3 shows auxiliary information such as the battery status of the phone, network connectivity quality and status, current time, velocity, speed, or other auxiliary information. In some embodiments, graphical display 3 may include a textual or graphical indicator of whether the current speed of the vehicle exceeds or is within the current speed limit on the stretch of road that the vehicle currently occupies. The present location of the vehicle may be identified by using location services 111, and the current location may be mapped to a stretch of road based on a map in navigation system 112. The speed limit on the stretch of road may then be retrieved from a database based on a query using the identifier of the road. In some embodiments, the auxiliary information displayed may be selected by the user. In other embodiments, graphical display 3 may rotate between auxiliary information based on an interval or other triggers. Graphical display 3 is illustrated in the bottom left of the screen, but it may also appear in the upper right, upper left, or bottom right of the screen.

Mini-map 4 may be a miniature map shown to the user while the user is in the live view 210. The mini-map may display the vehicle's current location 7, the next maneuver point 6, and the destination 5. In an embodiment, the mini-map displays an overhead view to allow the user to see the orientation to the next maneuver point 6 and destination 5 from a top-down view. The mini-map may display the map in a 2D overhead view or in 3D perspective. In some embodiments, the map is stylized with minimal detail in order to reduce clutter. For example, the map may show only roads and no buildings or other landmarks. In other embodiments, the mini-map may also include buildings and landmarks. Moreover, in some embodiments, the mini-map may display satellite or aerial photographed imagery.

In some embodiments, the route to the destination may be shown in a highlighted color such as green. Any other color may be used. The next maneuver point 6 and destination 5 may be illustrated using any kind of shape, icon, or object. When the destination 5 is not within the range of the mini-map, the destination 5 may be displayed on the edge, or rim, of the mini-map 4 in the direction of its physical location. The angle between the destination 5 on the rim of the mini-map 4 and the vehicle's current location may correspond to the angle between the destination and vehicle in the real-world. As the vehicle moves, the mini-map 4 may update its display of information to show the locale in the vicinity of the user. The destination 5 may move along the rim of the mini-map 4 without entering the interior of the mini-map while the destination 5 is not within the visible area of the mini-map 4. When the destination 5 comes within range of the visible area of the mini-map, the destination 5 may move from the rim of the mini-map into the interior of mini-map 4. The destination 5 may then be displayed in the mini-map at a location corresponding to its relative location as compared to the vehicle.

In some embodiments, the mini-map may automatically orient so that the direction of travel is up. In other embodiments, the mini-map may be have a static orientation, such as with up being north, down being south, left being west, and right being east. Other orientations may also be used. In some embodiments, multiple orientations may be provided as options to be selected by the user. Mini-map 4 is illustrated in the bottom right of the screen, but it may also appear in the upper right, upper left, or bottom left of the screen.

Graphical element 8 is an augmented reality overlay 8 that depicts the route to the destination as displayed in the real-world view. The augmented reality overlay 8 is displayed to appear as if it was in the real world to direct the user in the correct direction of travel. In one embodiment, the overlay 8 is shown on the road and displayed as if it were painted or projected on to the road. In other embodiments, the overlay 8 may be floating, such as a floating arrow or trail in the direction of the route. In some embodiments, the overlay 8 is shown only in the lane of the vehicle, and, in other embodiments, it may be displayed in other lanes or multiple lanes. The overlay 8 is illustrated as a series of chevrons but may be any shape or object. The overlay 8 may be any color. In an embodiment, the overlay is shown narrowing into the distance toward the horizon to show perspective, as if it existed in the real world. Moreover, the overlay 8 may also fade as it gets farther into the distance. In addition, cars, pedestrians, objects, or shadows that enter the path of the route may be shown to occlude the overlay 8 such that the occluding object appears to be over the overlay 8. This may be graphically accomplished in a number of ways. In one approach, objects in a scene are detected using an object detection algorithm. The CPU may then draw the overlay 8 on the screen, but not draw the overlay 8 on those pixels of the screen containing an object, which will then appear to be in the foreground, while the overlay 8 is in the background.

The route overlay 8 may be displayed as if it were on the road, such as by superimposing, using a variety of techniques. In one approach, a topographical map from navigation system 112 may be synchronized with the perspective of the video feed using data such as the current location and orientation of the device. Optionally, additional data produced by visual odometry, inertial odometry, landmark or anchor detection, or other techniques may be used to augment synchronization of the topographical map and the video feed. The road surface which is expected to be visible at the current location and orientation of the device may be extracted from the topological map. Overlay 8 may be projected onto the expected road surface and drawn in the video feed. In another approach, a computer vision algorithm or machine learning model may be used to segment and identify regions in the video feed which correspond to elements of the road such as the current lane, lane markers, other lanes, and shoulder of the road. In addition, attributes such as up-hill or down-hill orientation, curvature, and distance of the road may be detected. A 3D model of the road surface may be created using the elements and attributes identified from the video feed. Overlay 8 may be projected on to the 3D model of the road surface and drawn in the video feed.

Maneuver indicator 9 is a graphical indication of the next maneuver to be performed by the driver. The next maneuver may include arriving at the destination. The maneuver indicator may be of any shape or object. It may also be of any color. The maneuver indicator 9 may include a graphical or textual indicator of the maneuver to be performed. The maneuver indicator 9 may be displayed in a position that associates the maneuver indicator 9 with the maneuver location, which is the geospatial location where the maneuver should be performed. In an embodiment, the maneuver indicator 9 is displayed to appear to be floating above the maneuver location. Optionally, the maneuver indicator 9 may include a line connecting it to the ground at the maneuver location. In other embodiments, the maneuver indicator 9 may be displayed at or adjacent to the maneuver location. Optionally, the maneuver indicator 9 may have a highlight such as a white circle around a green circle. In addition, the appearance of maneuver indicator 9 may be adjusted to further associate maneuver indicator 9 with the maneuver location in the real world. The maneuver indicator 9 may be displayed using augmented reality techniques to appear as if it existed in the real-world environment. For example, the size, brightness, opacity, or other visual attributes of maneuver indicator 9 may be adjusted as the maneuver location gets closer to match the visual perspective of the video feed. These visual attributes may also be adjusted to change the highlighting of the maneuver indicator 9 as the maneuver indicator 9 gets closer or farther away. In some embodiments, the maneuver indicator 9 may be displayed as a 3-dimensional object and different sides of the maneuver indicator 9 may be displayed as the vehicle navigates to different positions around the maneuver location. In another example, cars, pedestrians, trees, signs, or other objects that enter the video feed between the camera and the maneuver location may be shown to occlude the maneuver indicator 9 such that the occluding object appears to be in front of maneuver indicator 9. Real-world objects in the scene may be detected and displayed in front of the maneuver indicator 9. In one embodiment, the display of the maneuver indicator 9 is adjusted to not display a portion of the maneuver indicator 9 where a foreground object appears in the video feed of the live view so that the portion appears to be occluded by the foreground object.

In order to display the maneuver indicator 9 in a position associated with the maneuver location, the display position of the maneuver location in the video feed may be determined. The maneuver indicator 9 may then be displayed at or adjacent to the display position of the maneuver location, or above the display position of the maneuver location by applying an offset in the Y-axis.

The display position of the maneuver location may be identified using a variety of techniques. In some embodiments, the display position of the maneuver location may be predicted or inferred based on input data such as the current geospatial location, the current camera orientation, and the geospatial location of the maneuver as provided by navigation system 112. Optionally, additional input data produced by visual odometry, inertial odometry, landmark or anchor detection, or other techniques may be used in predicting the display position of the maneuver location. In one example, one or more formulas or heuristics may be used to predict the display position of the maneuver from the input data. In another example, one or more machine learning models may be used to predict the display position of the maneuver from the input data. In some embodiments, the display position of the maneuver location may be directly identified in the video feed. A computer vision algorithm or machine learning model may be applied which takes the video feed as input and outputs the display position of the maneuver location. For example, the algorithm or model may identify a fixed object known to be located at or near the maneuver location. The fixed object may be a street sign, exit marker, intersection, stoplight, stop sign, or another fixed landmark. The display position of the fixed object may be returned as the display position of the maneuver location. In an embodiment, the same maneuver may be represented by the maneuver indicator 9, panel 2 describing the maneuver, and maneuver point 6 in mini-map 4.

All or parts of interface elements 1-9 may be transparent, semi-transparent, or translucent to allow for portions of the scene behind the interface elements 1-9 to be viewed through the interface elements 1-9.

Moreover, the display of elements 1-9 may be arranged to be highly usable and non-obstructive of the live feed view. In an embodiment, the live view 210 comprises four quadrants. In an embodiment, panel 1, panel 2, graphical display 3, and mini-map 4 are each in different quadrants. These four elements may be mixed and matched into different quadrants. For example, the mini-map 4 may be in any of the quadrants, and likewise for the other elements. In some embodiments, the interface elements in live view 210 are relatively small and shown directly on the video feed with no background panels or windows. In other words, interface elements are shown on the live feed directly without a separate component or window containing the interface elements. For example, in some embodiments, there are no full-length or full-width containers, panels, or windows to allow the live feed to take up the entire view of the display 115.

In some embodiments, the text in interface elements 1-9 in live view is white or light colored to show up on dark backgrounds. In other embodiments, the text is black or dark colored to show up on light backgrounds. In some embodiments, the color of the text may dynamically change based on the background to remain visible to the user, and the dynamic changing may be based on reading pixel data from the live feed and comparing the pixel intensities to one or more threshold values.

Figure 3:
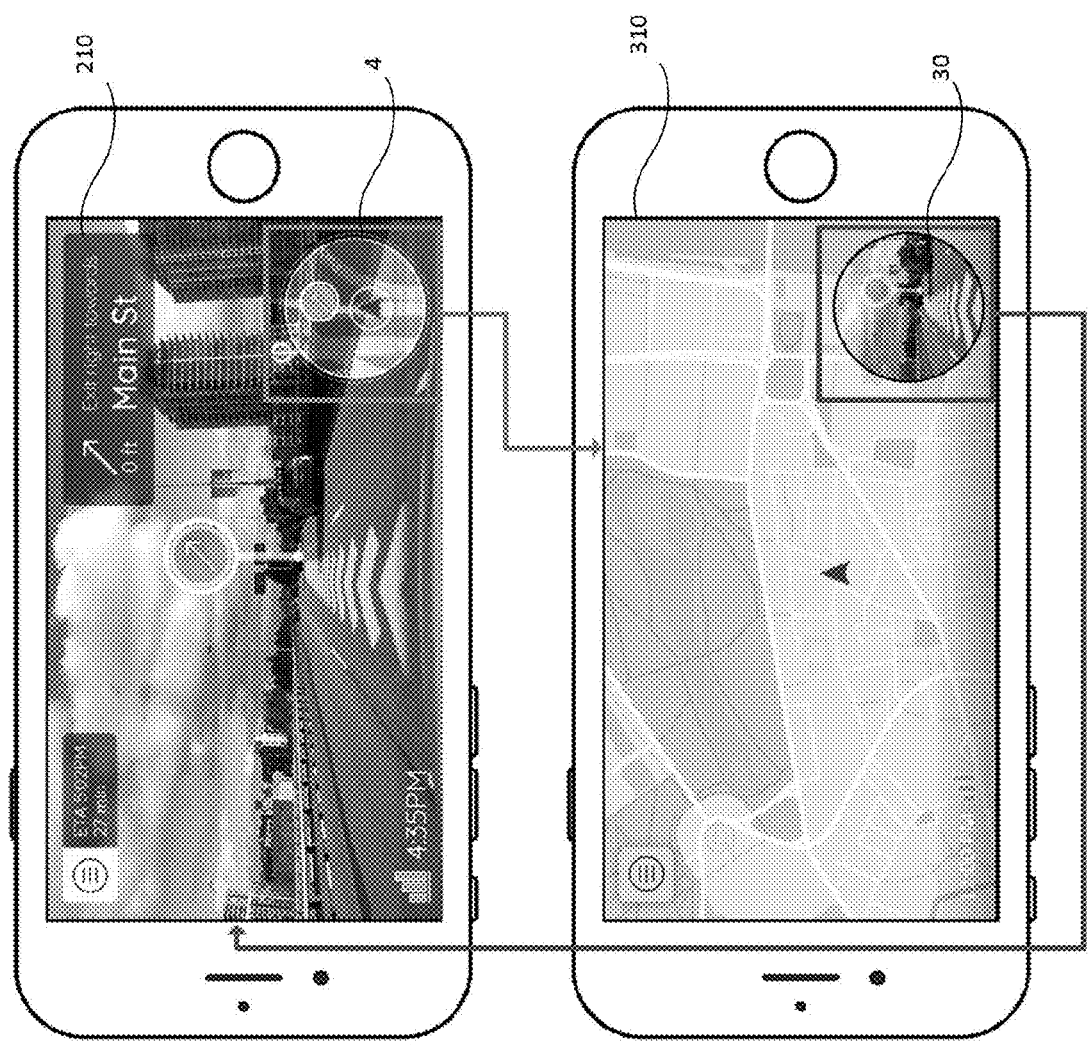
FIG. 3 illustrates an exemplary map view in an embodiment.

FIG. 3 illustrates an exemplary map view 310 displayed on the electronic device 102. The map view 310 may provide navigation guidance to the user through a graphical representation which is simplified, more stable, or otherwise easier to understand than the video feed. The map view may display a map, which may be provided by navigation system 112. The map view may also display interface elements, such as a mini-feed 30. In some embodiments, the map view may display one or more interface elements carried over from the live view 210, such as panel 1, panel 2, graphical display 3, or any or all of interface elements 4-9.

The map view 310 may be quickly switched to or from the live view 210 with minimal user interaction. In some embodiments, the map view 310 may be toggled from the live view 210 by a single user interaction with the mini-map 4. For example, a click, touch, selection, or swipe on mini-map 4 in the live view 210 may trigger switching to the map view 310. Additionally, the live view 210 may be toggled from the map view 310 by a single user interaction with the mini-feed 30. For example, a click, touch, selection, or swipe on the mini-feed 30 in the map view 310 may trigger switching to the live view 210. In other embodiments, a button, slider, switch, or other user interface element may be provided to toggle between the live view 210 and the map view 310. In other embodiments, an interaction gesture such as a single or multi-finger swipe, a pinch, a single or multi-tap, or other gesture may be used to toggle between the live view 210 and the map view 310. In other embodiments, a voice interaction such as a speaking a specific sound, word, or phrase may be used to toggle between the live view 210 and the map view 310. In other embodiments, an interaction with the electronic device 102, such as turning, shaking, or moving the electronic device 102, may be used to toggle between the live view 210 and map view 310.

In response to the toggle operation from the live view 210, the live view may be shrunk into the mini-feed 30 and the mini-map 4 may be enlarged into a full screen map in order to generate the map view 310. In response to the toggle operation from the map view 310, the map view may be shrunk into the mini-map 4 and the mini-feed 30 may be enlarged into a full screen augmented reality display to generate the live view 210.

Optionally, when the toggle is performed from the live view 210 to the map view 310, or vice versa, an animated transition may be displayed, such as fading the initial view to the subsequent view, wiping the screen from the initial view to the subsequent view, or performing a 3D flipping action to simulate the initial view and subsequent view being on opposite sides of a 3D panel that is flipped vertically or horizontally. The aforementioned animations are only exemplary and other animations, or no animation, may be used.

The map view may display the map in a 2D overhead view or in 3D perspective. The map view may display the vehicle's current location or center the map on the current location of the device. In some embodiments, the route to the destination, one or more upcoming maneuver points, or the destination may be displayed. The route may be shown in a highlighted color such as green, blue, or any other color. The upcoming maneuver points or the destination may be displayed using any kind of shape, icon, or object. In one embodiment, upcoming maneuver points or the destination may be displayed on the edge of the screen in the direction of their physical location. In some embodiments, an interface may be provided allowing the user to may scroll, shift, zoom in, or zoom out on the map. The interface may comprise graphical elements, such as buttons or sliders, or touch gestures, such as swiping or pinching. In some embodiments, the map view 210 may automatically orient the map so that the direction of travel is up. In other embodiments, the map may have a static orientation, such as with up being north, down being south, left being west, and right being east. Other orientations may also be used. In some embodiments, multiple orientations may be provided as options to be selected by the user.

The map may comprise an extended display of the miniature map shown by mini-map 4. In some embodiments, the map is stylized with minimal detail in order to reduce clutter. For example, the map may show only roads and no buildings or other landmarks. In other embodiments, the map may also include buildings and landmarks. Moreover, in some embodiments, the map may display satellite or aerial photographed imagery. In further embodiments, the map may be altered to show additional context. For example, roads may be colored based on additional data such as traffic congestion or speed limit. In one embodiment, the additional data may be retrieved from a remote database.

Mini-feed 30 may be a cropped or zoomed version of live view 210 shown to the user while the user is in the map view 310. The mini-feed 30 may display the live video feed captured by camera 110 and augmented reality overlays shown in live view 210 such as graphical element 8 or graphical element 9. The mini-feed 30 may optionally show any or all of interface elements 1-9. The mini-feed may be updated as a real-time view similar to live view 210. Mini-feed 30 is illustrated in the bottom right of the screen, but it may also appear in the upper right, upper left, or bottom left of the screen. In some embodiments, an interface may be provided which allows the size of the mini-feed 30 to be adjusted by the user, such as being resized larger or smaller. Additionally, the level of cropping or zooming may be adjusted. In some embodiments, all or parts of mini-feed 30 may be transparent, semi-transparent, or translucent to allow for portions of the map behind mini-feed 30 to be viewed through the mini-feed 30.

Figure 4:
FIG. 4 illustrates an exemplary hazard view in an embodiment.

FIG. 4 illustrates an exemplary hazard view 410 which may be displayed on electronic device 102. Hazard view 410 may display a live video feed collected from camera 110 along with optional augmented reality elements to warn the user of potential hazards. The potential hazards may comprise objects which are predicted to be hazardous by hazard detection system 116. The hazard view 410 may help draw the attention of the user to potential hazards which the user may not have noticed. The hazard view may include interface elements such as hazard indicator 41, hazard marker 42, hazard route overlay 43, and hazard frame 44. In some embodiments, hazard view 410 may comprise an extension of or overlay on live view 210 and include some or all of the interface elements 1-9 described in live view 210. The hazard view 410 may be triggered or activated by detection of a hazard. In some embodiments, hazard view 410 may be activated only when live view 210 is already displayed. In other embodiments, hazard view 410 may be activated regardless of the current view. For example, while the user is in map view 310, the detection of a hazard by the hazard detection system 116 may automatically apply a filter to transition the view to hazard view 410. In some embodiments, an interface element, setting, or interaction gesture may be provided to dismiss the hazard view 410. For example, the hazard view 410 may optionally be dismissed by swiping or a touch gesture.

Hazard indicator 41 is a graphical indication designed to draw attention to the existence and location of a potential hazard. The hazard indicator may be of any shape or object. It may also be of any color or change colors. The hazard indicator may blink, rotate, or be otherwise animated. The hazard indicator may be displayed in a manner that associates the hazard indicator with the potential hazard. For example, the hazard indicator may be placed on, above, below, or adjacent to the potential hazard. In another example, the hazard indicator may be placed in a single location with a line or arrow pointing to the potential hazard. The position of the hazard indicator may be adjusted to match movement of the potential hazard in the video feed. In some embodiments, the hazard indicator may be placed in a way that does not obscure the potential hazard. In some embodiments, the hazard indicator may have an audible component which is played or repeated while the hazard indicator is displayed. In some embodiments, the hazard indicator may include a short textual description such as "warning", "pedestrian", or "merging vehicle", or a short textual instruction such as "slow down", "watch left", or "avoid right". In some embodiments, multiple hazard indicators may be displayed when there are multiple hazards. In other embodiments a single hazard indicator may be displayed. When a single hazard indicator is displayed, it may be associated with the most urgent or dangerous hazard. The hazard indicator 41 may be moved around the screen to track the hazard.

Hazard marker 42 is a graphical indication designed to help the user quickly locate or identify the potential hazard. Hazard marker 42 may be an outline, bounding box, highlight, shading, tint, glow, or other visual effect placed around the potential hazard. The hazard marker 42 may be displayed to avoid obscuring the potential hazard. Hazard marker 42 may be of any color. In some embodiments, the color of hazard marker 42 may be selected to match the color of hazard indicator 41. In some embodiments, the hazard marker may include a short textual description of the potential hazard such as "merging vehicle", "debris", "pothole", or "pedestrian". The hazard marker 42 may be moved around the screen to track the hazard. In some embodiments, a user may dismiss a hazard indicator 41 or hazard marker 42 with a user interaction, such as a click, touch, selection, or swipe. After dismissal, the hazard indicator 41 or hazard marker 42 may disappear.

Hazard route overlay 43 is an augmented reality overlay which alters the appearance of route overlay 8 to alert the user to the existence of a potential hazard. Hazard overlay 43 may be displayed in place of overlay 8. Hazard overlay 43 may alter the color or shape of overlay 8. Hazard overlay 43 is illustrated as having a red color commonly associated with danger, but may be of any color. In some embodiments, the color of hazard overlay 43 may be selected to match the color of hazard indicator 41. Hazard overlay 43 is illustrated as a line but may be any shape or object. Hazard overlay 43 may blink, shake, or be otherwise animated. In some embodiments, hazard overlay 43 may also include an additional augmented reality overlay which alters the appearance of overlay 8. For example, hazard overlay 43 may alter the shape or color of overlay 8, and hazard overlay 43 may be displayed in place of overlay 8.

Hazard frame 44 is a graphical indication designed to alert the user to the existence of a potential hazard. Hazard frame may be a colored bar, gradient, or other pattern shown along at least a portion of one or more edges of the display. Hazard frame may blink, fade, or be otherwise animated. Hazard frame 44 is illustrated as having a red color commonly associated with danger, but may be of any color. In some embodiments, the color of hazard frame 44 is selected to match the color of hazard indicator 41. In some embodiments, the one or more edges where hazard frame 44 is displayed may be dynamically selected. For example, the hazard frame may be displayed on all or part of an edge closest to the potential hazard.

All or parts of interface elements 41-44 may be transparent, semi-transparent, or translucent to allow for portions of the scene behind the interface elements 41-44 to be viewed through the interface elements 41-44. In some embodiments, the hazard frame 44 is displayed as a translucent bar that fades gradually into the video displayed in the hazard view 410.

Figure 5:
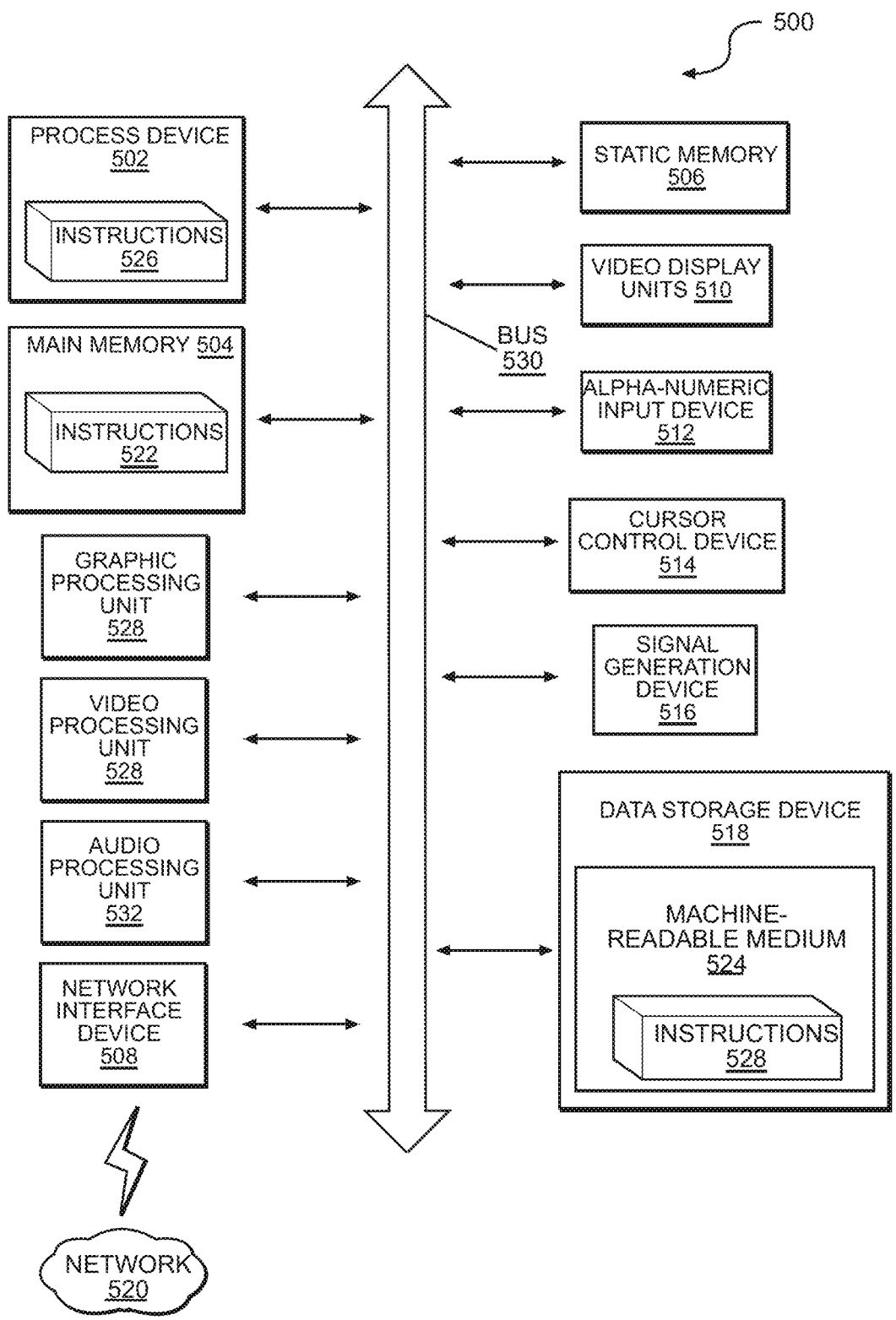
FIG. 5 illustrates an exemplary computer system in which methods herein may be performed.

FIG. 5 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 515 (e.g., a mouse), a graphics processing unit 522, a signal generation device 516 (e.g., a speaker), video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality corresponding to the components of a device to perform the disclosure herein. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A non-transitory computer readable medium comprising instructions that when executed by a system comprising one or more processors, cause the one or more processors to perform operations for displaying real-time navigation assistance to a user in a vehicle comprising:
   displaying, on a display of an electronic device, a live view, the live view comprising a view of a roadway with an augmented reality display of a route overlay to indicate a route and a maneuver indicator to indicate a location of a next maneuver;
   wherein the maneuver indicator is displayed in the augmented reality display near the location of the next maneuver; and the maneuver indicator becomes larger when the vehicle approaches it and smaller when the vehicle moves farther away from it.

2. The non-transitory computer readable medium of claim 1, wherein the route overlay is displayed on the ground of the roadway in the augmented reality display.

3. The non-transitory computer readable medium of claim 1, wherein the route indicator becomes smaller at points farther from the vehicle.

4. The non-transitory computer readable medium of claim 1, wherein a line is displayed connecting the maneuver indicator to the ground in the augmented reality display.

5. The non-transitory computer readable medium of claim 1, the operations further comprising displaying a maneuver panel for displaying a textual description of the next maneuver, the maneuver panel being separate from the maneuver indicator.

6. The non-transitory computer readable medium of claim 1, the operations further comprising:
displaying in the live view a mini-map;
receiving a toggle interaction from the user and, in response, toggling the display from the live view to a map view, the map view displaying a map of a locality around the vehicle.

7. The non-transitory computer readable medium of claim 1, the operations further comprising adjusting one or more visual attributes of the maneuver indicator as the maneuver location gets closer to the vehicle to match a visual perspective of the live view.

8. The non-transitory computer readable medium of claim 1, the operations further comprising displaying the maneuver indicator as a 3-dimensional object having different sides, wherein the different sides may be displayed as the vehicle navigates to different positions around the maneuver location.

9. The non-transitory computer readable medium of claim 1, the operations further comprising displaying the maneuver indicator as being occluded by real-world objects that enter the live view such that the real-world object appears to be in front of the maneuver indicator.

10. A non-transitory computer readable medium comprising instructions that when executed by a system comprising one or more processors, cause the one or more processors to perform operations for displaying real-time navigation assistance to a user in a vehicle comprising:
displaying, on a display of an electronic device, a live view, the live view comprising a view of a roadway with an augmented reality display of a route indicator to indicate a route and a maneuver indicator to indicate a location of a next maneuver;
displaying in the live view a mini-map with an exterior surface and having a destination pin;
wherein the destination pin represents a map destination, and the destination pin is visible on a portion of the exterior surface to indicate a direction of the destination pin relative to the vehicle on the mini-map;
wherein the destination pin remains on the portion of the exterior surface until a region surrounding the destination pin falls within a bounds of the exterior surface.

11. The non-transitory computer readable medium of claim 10, wherein the route indicator is a route overlay.

12. The non-transitory computer readable medium of claim 11, wherein the route overlay is displayed on the ground of the roadway in the augmented reality display.

13. The non-transitory computer readable medium of claim 10, wherein the route indicator becomes smaller at points farther from the vehicle.

14. The non-transitory computer readable medium of claim 10, wherein a line is displayed connecting the maneuver indicator to the ground in the augmented reality display.

15. The non-transitory computer readable medium of claim 10, the operations further comprising displaying a maneuver panel for displaying a textual description of the next maneuver, the maneuver panel being separate from the maneuver indicator.

16. The non-transitory computer readable medium of claim 10, the operations further comprising receiving a toggle interaction from the user and, in response, toggling the display from the live view to a map view, the map view displaying a map of a locality around the vehicle.

17. The non-transitory computer readable medium of claim 16, wherein the toggle interaction is a user interaction on the mini-map.

18. The non-transitory computer readable medium of claim 16, the operations further comprising:
displaying a mini-feed in the map view, the mini-feed displaying a live view of the roadway, the mini-view including the augmented reality display of the route overlay and maneuver indicator.

19. The non-transitory computer readable medium of claim 18, further comprising:
receiving a second toggle interaction from the user and, in response, toggling the display from the map view to the live view, wherein the second toggle interaction comprises a user interaction on the mini-feed.

20. A non-transitory computer readable medium comprising instructions that when executed by a system comprising one or more processors, cause the one or more processors to perform operations for displaying real-time navigation assistance to a user in a vehicle comprising:
displaying, on a display of an electronic device, a live view, the live view comprising a view of a roadway with an augmented reality display of a route indicator to indicate a route;
detecting, by a hazard detection system, a hazardous object on the roadway and displaying on the augmented reality display a hazard indicator near the hazardous object and a hazard marker, wherein the hazard indicator is placed near the hazardous object on the display, and the hazard indicator tracks the hazardous object on the display.

21. The non-transitory computer readable medium of claim 20, wherein the route indicator is a route overlay.

22. The non-transitory computer readable medium of claim 21, wherein the route overlay is changed to a hazard overlay when the hazardous object is detected.

23. The non-transitory computer readable medium of claim 20, wherein the hazard marker identifies a location of the hazardous object.

24. The non-transitory computer readable medium of claim 20, the operations further comprising displaying a hazard frame comprising a bar shown on at least one edge of the display.

25. The non-transitory computer readable medium of claim 20, the operations further comprising: receiving a dismiss user interaction and dismissing the display of the hazard indicator and hazard marker.

26. The non-transitory computer readable medium of claim 20, the operations further comprising:
displaying in the live view a mini-map; receiving a toggle interaction from the user and, in response, toggling the display from the live view to a map view, the map view displaying a map of a locality around the vehicle.

* * * * *